United States Patent [19]

Burton et al.

[11] Patent Number: 4,899,481
[45] Date of Patent: Feb. 13, 1990

[54] AUTOMATIC LONG LINE COMMERCIAL FISHING APPARATUS

[76] Inventors: Charles D. Burton, 484 "B" St.; Matthew Morgan, 8224 Snohomish Rd., both of Blaine, Wash. 98230

[21] Appl. No.: 255,744

[22] Filed: Oct. 11, 1988

[51] Int. Cl.⁴ .............................................. A01K 97/00
[52] U.S. Cl. ............................................ 43/4; 43/6.5
[58] Field of Search ............... 43/4, 6.5, 27.4, 57.3, 43/4.5, 6.4

[56] References Cited

U.S. PATENT DOCUMENTS

| | | | |
|---|---|---|---|
| 1,768,981 | 7/1930 | Henrikson | 43/27.4 |
| 2,670,556 | 3/1954 | Hopkins et al. | 43/4 |
| 3,377,733 | 4/1968 | Godo | 43/4 |
| 3,841,011 | 10/1974 | Tison | 43/4 |
| 4,015,359 | 4/1977 | Andrews | 43/4 |
| 4,107,865 | 8/1978 | Alex | 43/27.4 |
| 4,132,025 | 1/1979 | Tison | 43/4 |
| 4,250,648 | 2/1981 | Jacobsen | 43/4 |
| 4,266,359 | 5/1981 | Alex | 43/6.5 |
| 4,277,905 | 7/1981 | Huse | 43/4 |
| 4,354,323 | 10/1982 | Huff | 43/4 |
| 4,453,330 | 6/1984 | Jorgensen-Dahl | 43/6.5 |
| 4,461,112 | 7/1984 | Jacobsen | 43/4 |
| 4,505,062 | 3/1985 | Cook, Jr. | 43/6.5 |
| 4,525,947 | 7/1985 | Furlong | 43/4 |
| 4,566,215 | 1/1986 | Bjorshol | 43/4 |
| 4,631,850 | 12/1986 | Chureau | 43/4 |

FOREIGN PATENT DOCUMENTS

| | | | |
|---|---|---|---|
| 102350 | 8/1963 | Norway | 43/6.5 |
| 104806 | 9/1964 | Norway | 43/27.4 |

Primary Examiner—Richard K. Seidel
Assistant Examiner—Michael William Starkweather
Attorney, Agent, or Firm—H. Albert Richardson, Jr.

[57] ABSTRACT

An apparatus for use with commercial long line fishing gear for receiving the long line as it is hauled from the sea, separating the gangions and hooks from the line and directing them to a storage tub or other storage means. The long line enters the apparatus through an entrance funnel and then passes through a guide funnel where the hooks are oriented substantially in a common plane. Thereafter, the line passes through a sorting gate assembly which orients the bends of the hooks in a common manner and directs them onto a rail assembly. The hooks are then guided by the rail assembly to a storage rail attached to a storage tube. As the hooks proceed along the rail assembly the ground line is drawn over a hydraulically powered sheave and directed into the storage tub.

15 Claims, 5 Drawing Sheets

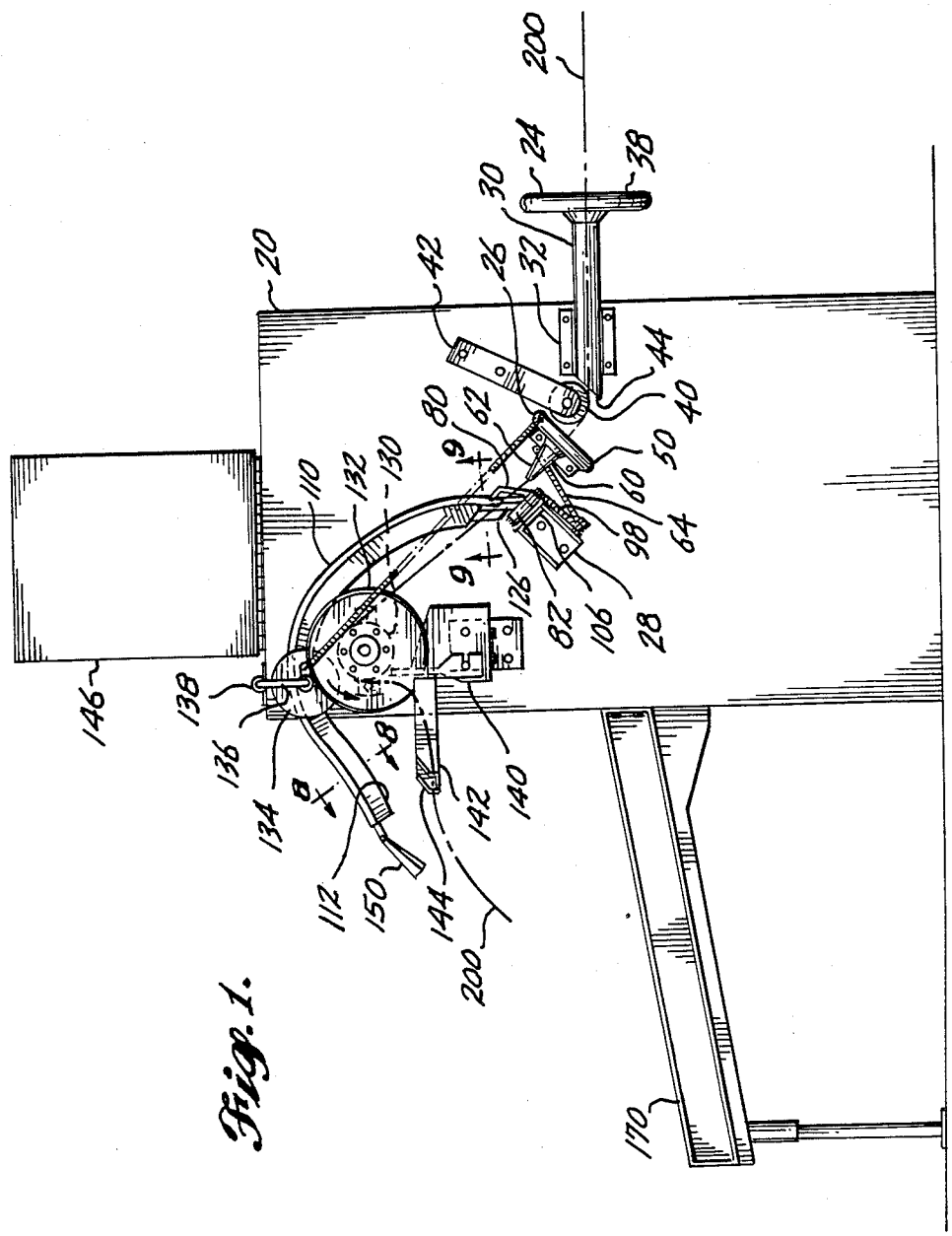

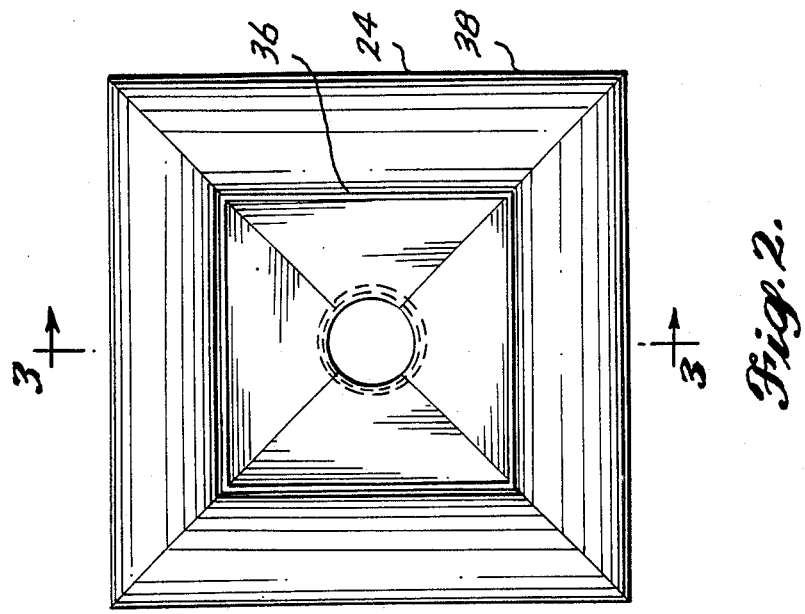
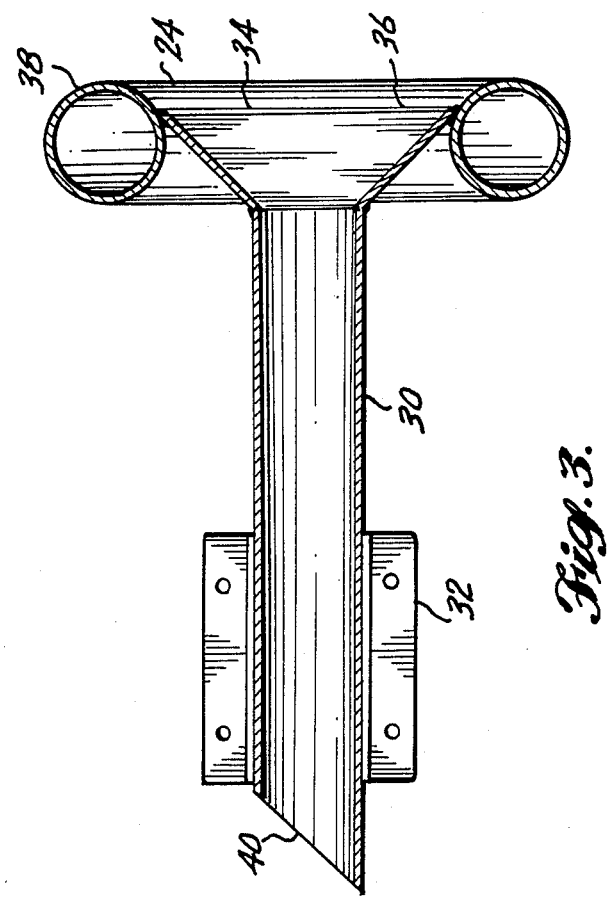

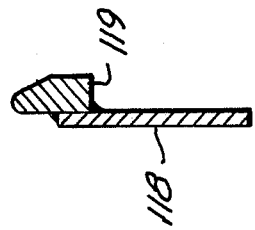
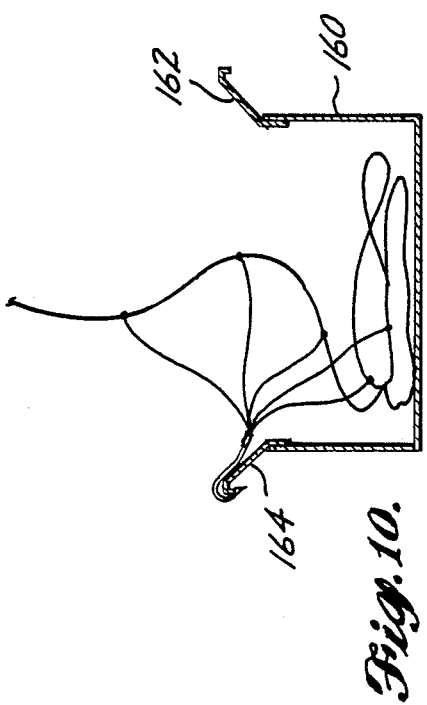
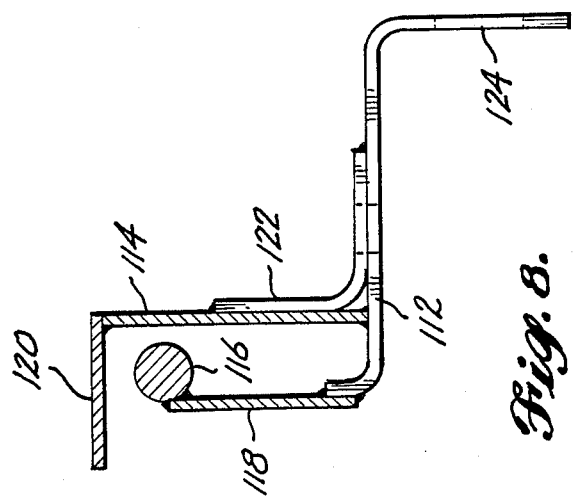

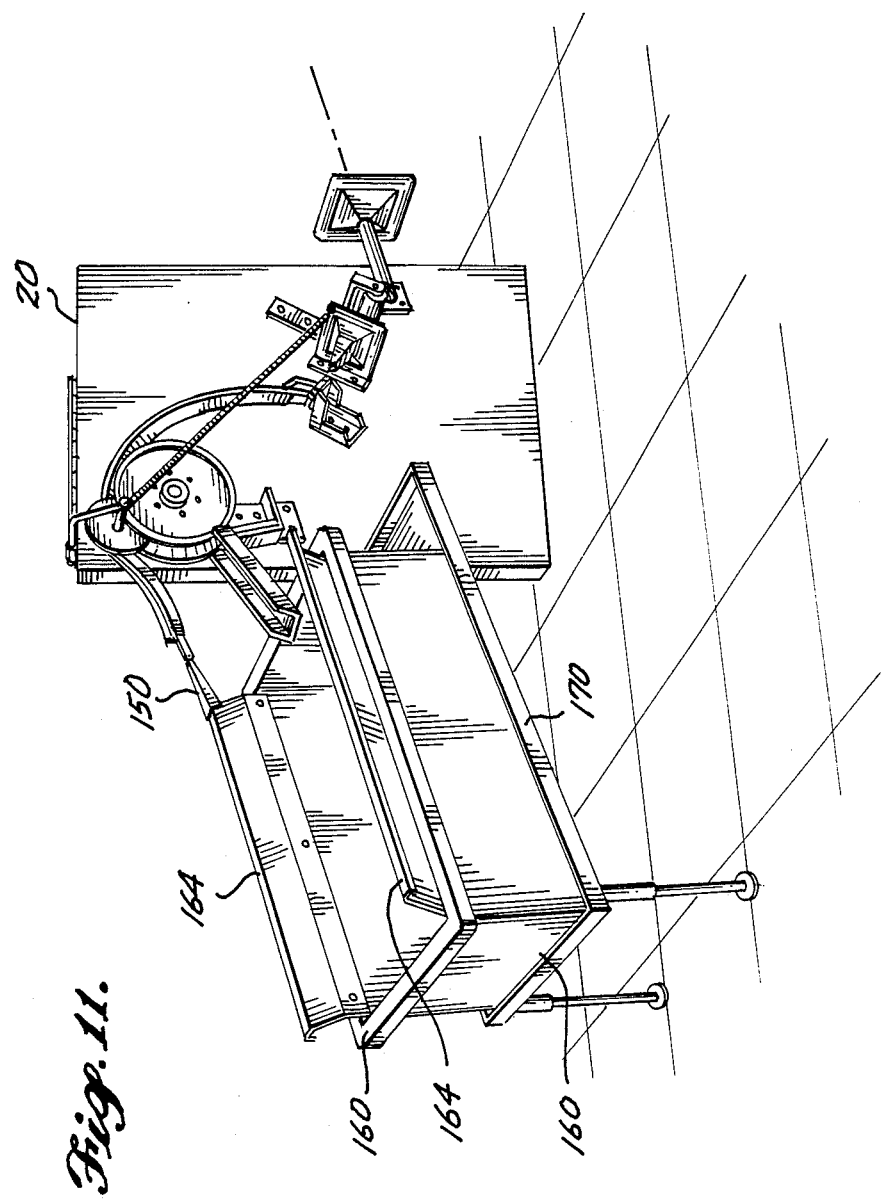

AUTOMATIC LONG LINE COMMERCIAL FISHING APPARATUS

BACKGROUND OF THE INVENTION

This invention generally relates to commercial fishing gear and more particularly to an automatic apparatus for receiving long line fishing gear upon its retrieval from the sea and arranging it for systematic storage and deployment.

A "long line" is the most common type of commercial fishing gear used to catch bottom feeding fish such as sole, cod and halibut. Long line gear includes a ground line which is typically a nylon rope having a length of between 2 and 2-½ miles and a diameter of approximately ⅜ inch. Attached to it are a large number of leaders or gangions which are spaced apart a distance of approximately 30 inches and are made of nylon monofiliment approximately 24" long and having a tensile strength somewhat less than the ground line. A single hook is attached to the outer end of each leader or gangion. The leaders may be permanently attached to the ground line or may be manually removable permitting them to be disconnected from the line as it is retrieved from the sea. These two types of gear are commonly referred to as "fixed" and "snap-on" systems, respectively. It should be understood that this invention is intended for use only with "fixed" long line gear.

Operation is begun by anchoring the distal end of the long line and marking its location with a float. The remainder of the line is paid out from the stern of the fishing vessel as it moves forward. Bait may be attached to the hooks either manually or automatically by passing the line through an automatic baiting device as it is paid out. Laying of the line is completed by anchoring the opposite end of the line and also marking it with a float. After an appropriate period of time the near end of the line is located, retrieved and connected to a primary hauler mounted amidships of the vessel. Fish are stripped from the hooks as the line is hauled on board by passing it through a stripping device.

As in any commercial fishing operation the income produced by the vessel depends upon the speed with which the fishing gear can be deployed, retrieved and ready for re-deployment. Handling of the long line together with the thousands of hooks and leaders attached to it on board the vessel can pose a sizeable problem. Traditionally, as the line is retrieved by the primary hauler the crew manually separates the hooks from the long line, arranges them sequentially on a storage rail and coils the ground line below. The process is relatively slow and poses certain risks for the handlers. To alleviate these problems numerous attempts have been made to develop devices which automatically retrieve and store the line. Unfortunately, these devices tend to be unreliable and relatively expensive. Also, some of them are restricted as to the size or configuration of hooks with which they will function, thus limiting their usefulness.

Accordingly, it is an object of this invention to provide for an automatic commercial long line fishing apparatus which will function reliably with all types of "fixed" long line fishing gear configurations.

It is a further object of this invention to provide for such an apparatus which will function reliably with all types of common commercial hook configurations.

It is a further object of this invention to provide for such an apparatus which can be manufactured and sold at a price more reasonable than other such devices currently available.

SUMMARY OF INVENTION

This invention can be broadly summarized as providing for an automatic commercial fishing apparatus for use with long line fishing gear of the type described above, including a power means for advancing the ground line through the apparatus, hook orienting means including a guide funnel and means for receiving the hooks from the orienting means and guiding them to storage.

The invention can be further summarized as an automatic commercial fishing apparatus for use with such long line gear including power means for advancing the ground line through the apparatus, means for guiding the hooks sequentially to storage, and a hook orienting means including a rollover finger for engaging certain preselected hooks, reorienting them and directing them toward the guiding means.

In accordance with the more detailed aspects of the invention the apparatus includes an entrance funnel, a guide funnel, a sorting gate assembly having a pivotally mounted rollover finger, a rail assembly for guiding the hooks sequentially to storage and a hydraulically driven sheave for advancing the long line gear through the apparatus.

BRIEF DESCRIPTION OF THE DRAWINGS

FIG. 1 is a side view of a long line automatic commercial fishing apparatus constructed in accordance with the present invention.

FIG. 2 is a front view of the entrance funnel shown in FIG. 1.

FIG. 3 is a sectional view of the entrance funnel taken at 3—3 of FIG. 2.

FIG. 8 is a partial sectional view of the bounce and hook rail assembly taken at 8—8 of FIG. 1.

FIG. 9 is a partial sectional view of the rail assembly taken at 9—9 of FIG. 1.

FIG. 10 is a cross sectional view of a storage tub adapted for use with the present invention.

FIG. 11 is a perspective view of the storage tub of FIG. 10.

DESCRIPTION OF THE PREFERRED EMBODIMENT

Figure 4:
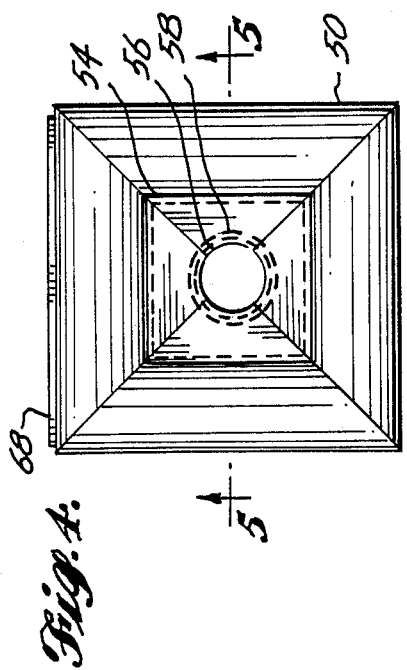
FIG. 4 is a front view of the guide funnel sown in FIG. 1.

The novel features believed to be characteristic of this invention are set forth in the appended claims. The invention itself, however, may be best understood and its various objects and advantages best appreciated by reference to the detailed description below in connection with the accompanying drawings.

In FIG. 1 of those drawings an automatic commercial long line fishing apparatus is illustrated and generally designated by the number 10. It includes a frame or bulkhead 20 which is preferably made of stainless steel sheet and reinforced by channel members, not shown, attached to the back of the sheet. The bulkhead is rigidly secured to vessel deck 22 by other means also not shown. The apparatus further includes entrance funnel 24, guide funnel 26, and sorting gate assembly 28. The entrance funnel is shown in more detail in FIGS. 2 and 3. Referring to those figures it can be seen that the funnel includes tubular member 30 to which mounting bracket 32 is welded. The bracket is used to attach the funnel to the bulkhead as shown in FIG. 1. Attached to the right hand end of member 30 is funnel 34 which is formed such that its cross-sectional shape transitions from circular at its point of attachment to member 30 to square at its outer end 36. Outer rim 38 is formed from four welded sections of tubing and is welded to the periphery of end 36 of funnel 34 shown in FIG. 3. The purpose of the outer rim is to provide added rigidity to funnel 34 and to provide a smoothly contour at entrance to the funnel. The inside diameter of tubular member 30 is selected so that any hooks in common use with long line systems can pass through it easily. Roller 40, which is attached to the bulkhead by means of bracket 42, is positioned immediately to the left of exit end 44 of the entrance funnel.

Figure 5:
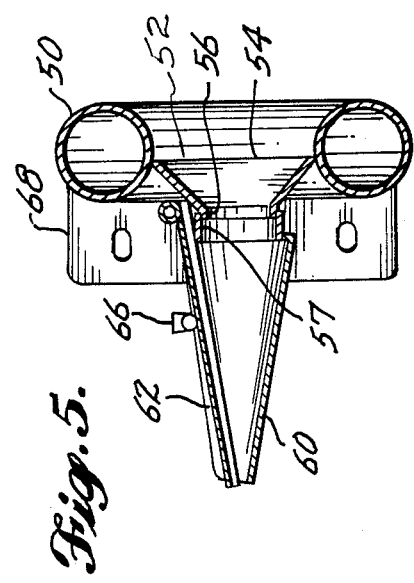
FIG. 5 is a sectional view of the guide funnel taken at 5—5 of FIG. 4.

Guide funnel 26, shown in detail in FIGS. 4 and 5, is mounted to the bulkhead to the left of and somewhat above roller 40. The purpose of the guide funnel is to receive the long line from the entrance funnel and orient all of the hooks so that they lie approximately in a common plane. The guide funnel includes outer rim 50 which is similar in shape and construction to outer rim 38 of the entrance funnel. It is welded to funnel member 52 which is somewhat similar in shape to funnel member 34 of the entrance funnel. It is formed such that its cross-section transitions from rectangular at its entrance end 54 to circular at throat section 56. The throat section of the funnel is welded to a cylindrical member 58 which in turn is welded to tapered guide section 60 as shown in FIG. 5. The guide section is generally rectangular in cross-section and tapered from right to left. The upper surface of the guide section is formed by funnel cover 62 which is hinged at its right hand edge to outer rim 50. The cover is biased toward a closed position by spring 64 which is attached at one end to arm 66 of the cover. The purpose of the hinged cover is to permit obstructions such as a knot in the long line to pass through the guide funnel without jamming or damaging it. The guide funnel is mounted to the bulkhead by bracket 68 which is welded to the inner end of rim 50.

Another important aspect of this invention is sorting gate assembly 28 which is mounted just to the left of guide funnel 26 as shown in FIG. 1. The assembly includes rollover finger 80, housing 82 and bracket 84. As stated above, as the long line passes through the guide funnel the attached hooks are approximately oriented in a common plane by guide section 60 as they pass through the funnel. Each hook leaving the exit of the funnel will normally be oriented so that its shank is parallel to the long line but the bend may be oriented in one of two directions. The purpose of the sorting gate assembly is to receive the hooks from the guide funnel, uniformly orient them and direct them on to the rail assembly described below.

Figure 6:
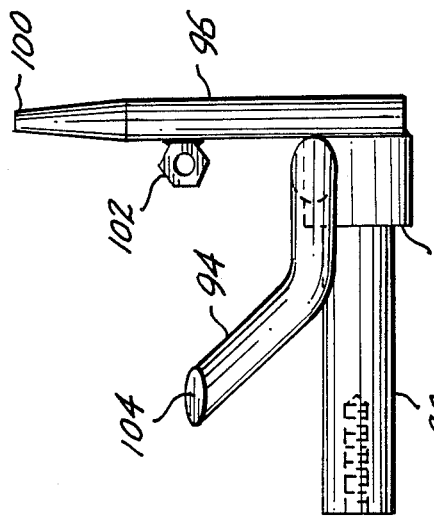
FIG. 6 is a top view of the rollover finger shown in FIG. 1.
Figure 7:
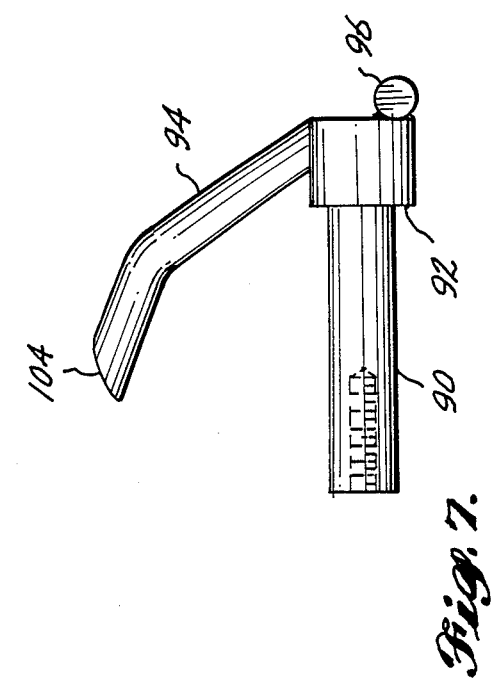
FIG. 7 is a side view of the rollover finger.

The rollover finger is shown in more detail in FIGS. 6 and 7. In those figures it can be seen that the rollover finger includes shaft 90 which has a cylindrical head section 92. Attached to the head section are finger 94 and arm 96. The rollover finger, shown in operating position in FIG. 1, is mounted for rotation in housing 82 and biased for clockwise rotation, as viewed from the right, by spring 98 which is attached to outer end 100 of arm 96. Housing 82 is welded to section 106 of bracket 84. Also attached to arm 96 is adjustment nut 102. Clearance between tip 104 of the rollover finger and the rail assembly may be adjusted by means of a bolt, not shown, which is threaded through nut 102 and rests against upper section 106 of bracket 84.

Also mounted to bulkhead 20 is curved rail assembly 110. The rail assembly includes hook rail 112 which receives properly oriented hooks from the rollover finger, separates them from the long line, and directs them to storage. The purpose of the bounce rail is to retain the hooks on the hook rail and to provide protection to the operator of the apparatus. Referring to the cross-section of the rail assembly shown in FIG. 8, it can be seen that both rails are essentially Z shaped in cross-section. The hooks ride on rod 116 which is welded to section 118 of the hook rail. The bounce rail is formed of angles 120 and 122 and the two rails are adjustably connected by a series of bolts. The vertical gap between rod 116 and the bounce rail may be adjusted by placing shims between angle 122 and the hook rail. Adjustment of the horizontal gap between the rod and the bounce rail is accomplished by shifting the bounce rail to the left or right with respect to the hook rail. FIG. 9 illustrates the cross-sectional shape of the rail assembly in the vicinity of its lower end 126 where the hooks are received. The rail assembly is attached to bulkhead 20 by means of a series of space bolts passing through section 124 and into the bulkhead.

Power for advancing the long line through the apparatus is provided by variable speed hydraulic motor 130 to which sheave 132 is attached. As the long line passes from the exit of the guide funnel and upward over the sheave it is drawn into engagement in the groove of the sheave by the tension on the line. As the line passes over the top of the sheave it is held in the groove by tensioning wheel 134. The wheel is mounted for rotation on arm 136 which in turn is pivotally mounted in bracket 138 to the top of the bulkhead. As the line passes further around the sheave it is removed from the groove by peeler assembly 140 and falls into peeler chute 142. The chute is adjustably mounted to the peeler assembly so that end 144 can be moved either horizontally or vertically as necessary. Protective guard 146, shown in the raised position in FIG. 1, is pivotally mounted to the top of the bulkhead and can be rotated downward to cover a portion of the rail assembly and sheave.

In operation the long line is hauled in from the sea by a primary hauler not shown and drawn into the apparatus by sheave 132. The nominal path of the line through the apparatus is indicated by center line 200 in FIG. 1. It passes through the entrance funnel from the right, over roller 40 and into the guide funnel. After leaving the guide funnel the line passes between the rollover finger and the rail assembly and directly onto the sheave and the hooks are directed to the rollover finger. The hooks having their bends oriented inward toward the bulkhead bypass the rollover finger and pass directly onto member 119 of the hook rail whereas oppositely directed hooks engage the rollover finger, are rotated 180° as they pass over it, and then engage member 119. As the hooks pass sequentially onto the hook rail they are drawn upward and separated from the long line.

If an obstruction on one of the hooks interferes with its passage between tip 104 of the rollover finger and the hook rail, the rollover finger will rotate away from its operating position permitting the obstruction to pass.

Hooks leaving the left hand end of the hook rail are directed toward a storage means such as a rail by beaver tail 150. Line exiting peeler chute 142 is typically directed into a tub placed beneath the rail. One such tub which has been adapted for use with the present invention is illustrated in FIGS. 10 and 11. The tub includes lower section 160 which is preferably made of fiberglass and two opposing rails 162 and 164 which are fastened to opposite sides of the tub. When the tub is placed on the tub table 170 and the apparatus is in operation, line from the peeler chute is simply accumulated in the bottom of the tub and hooks are guided onto rail 164 by the beaver tail. Occasionally during operation hooks may fail to engage the hook rail and are carried over the sheave with the long line. In that event the operator simply places the hook on opposing rail 162. In most cases hooks which fail to properly engage the rail have become deformed during fishing operations.

Thus it can be seen that the present invention provides for an automatic long line commercial fishing apparatus which incorporates many novel features and offers significant advantages over the prior art. Although only one embodiment of this invention has been illustrated and described it is to be understood that obvious modifications can be made in it without departing from the true scope and spirit of the invention.

We claim:

1. An automatic commercial fishing apparatus for use with long line fishing gear of the type including a ground line, a plurality of spaced leaders attached thereto and a plurality of hooks each attached to an associated leader, the apparatus comprising:
   power means for advancing the long line gear through the apparatus;
   hook orienting means including a guide funnel for discharging the hooks substantially in a preselected plane, the guide funnel having a releasable means to facilitate the passage through the funnel of an obstruction attached to the long line gear; and,
   means for receiving the hooks from the orienting means and guiding them sequentially to storage.

2. The apparatus of claim 1 wherein the releasable means includes a pivotally mounted funnel cover having a closed position and means for biasing the cover toward the closed position.

3. The apparatus of claim 1 wherein the guide funnel includes a slotted exit for orienting the hooks.

4. An automatic commercial fishing apparatus for use with long line fishing gear of the type including a ground line, a plurality of spaced leaders attached thereto and a plurality of hooks each attached to an associated leader, the apparatus comprising:
   power means for advancing the long line gear through the apparatus;
   means for guiding the hooks sequentially to storage; and hook orienting means including a rollover finger for engaging preselected hooks and directing them toward the guiding means, wherein the rollover finger has an operating position and further includes mounting means permitting displacement of the rollover finger from the operating position during operation.

5. The apparatus of claim 4 wherein the rollover finger is mounted for rotation away from an operating position and the means for orienting includes means for biasing the rollover finger toward the operating position.

6. The apparatus of claim 4 wherein the guiding means includes a rail assembly having a hook rail adapted to receive the hooks from the hook orienting means.

7. The apparatus of claim 6 further including a bounce rail for retaining the hooks on the hook rail.

8. The apparatus of claim 4 wherein the guiding means includes an arcuate rail assembly having a hook rail adapted to receive the hooks from the hook orienting means and an arcuate bounce rail adjustably disposed near the hook rail for retaining hooks on the hook rail.

9. An automatic commercial fishing apparatus for use with long line fishing gear of the type including a ground line, a plurality of spaced leaders attached thereto and a plurality of hooks each attached to an associated leader, the apparatus comprising:
   power means for advancing the long line gear through the apparatus;
   hook orienting means including a guide funnel and a rollover finger for engaging preselected hooks from the guide funnel;
   the rollover finger and guide funnel defining a gap therebetween; and
   whereby the preselected hooks are transferred from the rollover finger across the gap to the guide funnel and the remaining hook bypass the rollover finger, engage the guide funnel and pass through the gap.

10. The apparatus of claim 9 wherein the power means includes a hydraulically powered sheave.

11. The apparatus of claim 9 further including means for storing the long line gear.

12. The apparatus of claim 11 wherein the storage means includes a tub having a storage rail adapted to receive hooks from the guiding means.

13. The apparatus of claim 9 further including an entrance funnel for receiving the long line gear.

14. An automatic commercial fishing apparatus for use with long line fishing gear of the type including a ground line, a plurality of spaced leaders and a plurality of hooks, each attached to an associated leader, the apparatus comprising:
   power means including a hydraulically driven sheave for advancing the long line gear through the apparatus; hook orienting means including a guide funnel having a pivotally mounted funnel cover to permit the passage of an obstruction through the funnel and a rotatable rollover finger for engaging preselected hooks discharged from the guide funnel,
   an arcuate rail assembly having a hook rail adapted to receive hooks from the hook orienting means and guide them sequentially to storage; and
   means for storing the long line gear.

15. The apparatus of claim 9 wherein the rollover finger has an operating position and is mounted to permit displacement from the operation position during operation.

* * * * *